United States Patent [19]
McCardle, Jr. et al.

[11] 3,981,450
[45] Sept. 21, 1976

[54] IN-FLIGHT MODULATING THRUST REVERSER

[75] Inventors: Arthur McCardle, Jr., Greenhills; George H. Israel, Jr., Cincinnati; Frank J. Trombetta, West Chester; David F. Howard, Madeira, all of Ohio

[73] Assignee: The United States of America as represented by the Secretary of the Air Force, Washington, D.C.

[22] Filed: Sept. 22, 1975

[21] Appl. No.: 615,757

[52] U.S. Cl. .......................... 239/265.31; 60/230; 239/265.39; 244/110 B
[51] Int. Cl.² ........................................ B64C 15/06
[58] Field of Search ............ 244/23 D, 110 B, 53 R; 239/265.13, 265.19, 265.23, 265.25, 265.27, 265.29, 265.31, 265.33, 265.35, 265.37, 265.39; 60/226 A, 230

[56] References Cited
UNITED STATES PATENTS

| | | | |
|---|---|---|---|
| 2,950,595 | 8/1960 | Laucher et al. | 239/265.31 |
| 3,262,271 | 7/1966 | Beavers | 60/266 A |
| 3,347,467 | 10/1967 | Carl et al. | 239/265.31 |
| 3,484,847 | 12/1969 | Poole | 239/265.31 |
| 3,500,646 | 3/1970 | Hom et al. | 239/265.29 |
| 3,703,258 | 11/1972 | Wildner | 239/265.31 |

FOREIGN PATENTS OR APPLICATIONS

| | | | |
|---|---|---|---|
| 1,287,444 | 1/1969 | Germany | 239/265.31 |

*Primary Examiner*—Stephen G. Kunin
*Assistant Examiner*—Galen L. Barefoot
*Attorney, Agent, or Firm*—Joseph Rusz; Arthur R. Parker

[57] ABSTRACT

A translating flap convergent/divergent-aircraft engine thrust nozzle and integrated thrust reverser including a cascade for reversing the flow of engine exhaust, an inner exhaust duct-translating segment and an outer cowl normally enclosing the cascade therebetween; a series of blocker doors positioned in a normal stowed, inactive relation in the aft end portion of the thrust nozzle; main, hydraulic actuators are interconnected with and operable to simultaneously translate the translating segment and cowl to open a reverse-exhaust flow path through the cascade; and a cam-operated device interconnected between the translating segment and the blocker doors to automatically reposition the blocker doors to an active position blocking the engine exhaust path through the thrust nozzle in concert with the translation of the translating segment and cowl to their reverse flow-producing positions.

10 Claims, 13 Drawing Figures

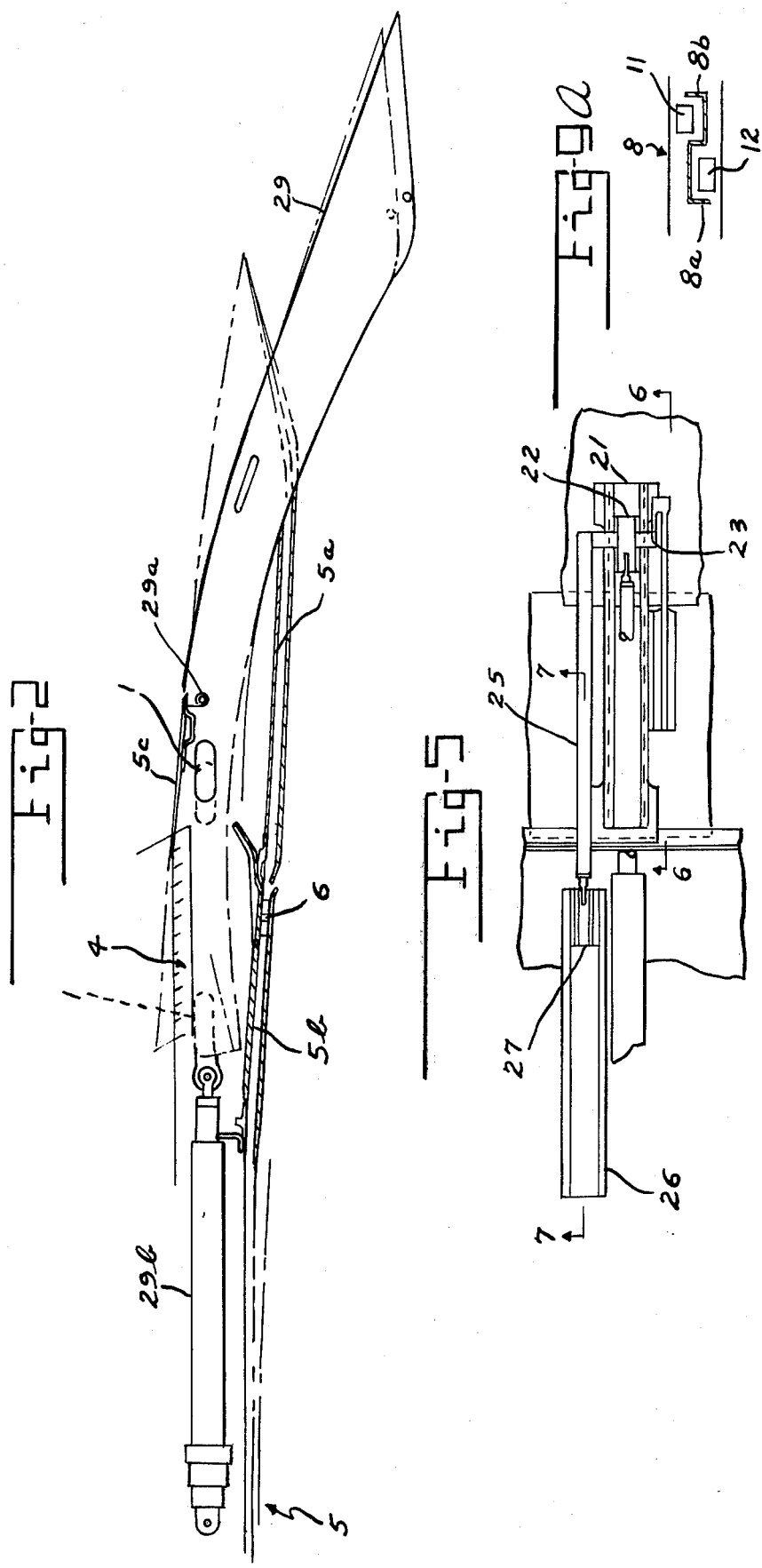

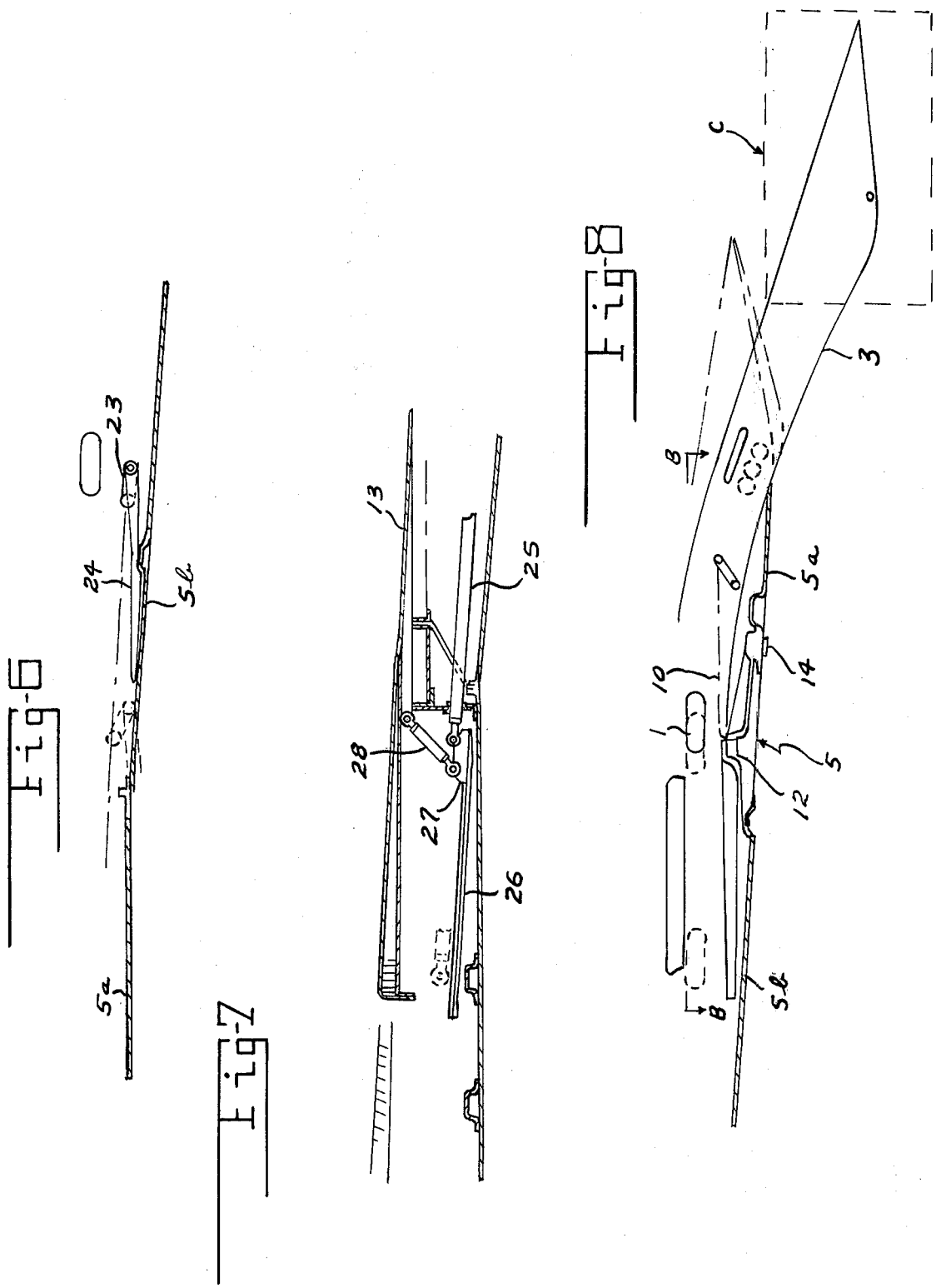

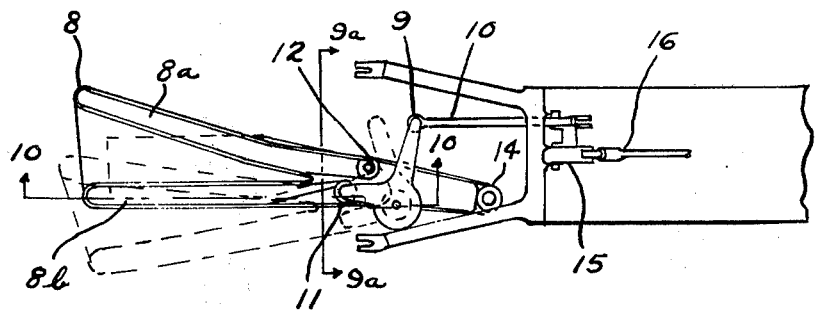
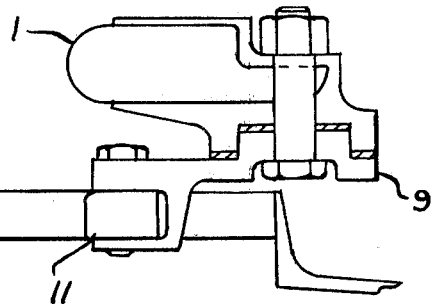
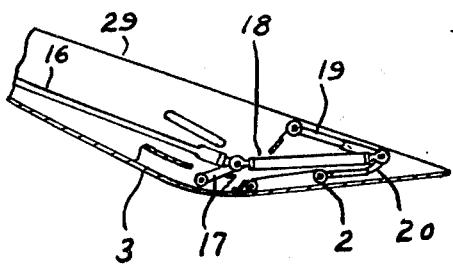
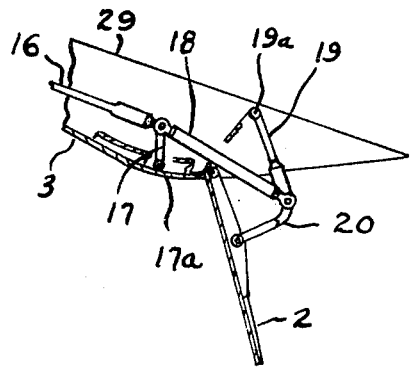

ably, this should be accomplished with as little disturbance or change as possible in the normal aerodynamic members used for other engine functions. In performing its required functions, it is of considerable importance that the thrust reverser also have relatively good thrust modulation characteristics to provide both for an immediate and full thrust whenever the need arises, as for example, during inflight maneuvers or where a wave-off and an emergency go-around is required during an aircraft landing operation. In other words, it is desirable that the particular thrust reverser specifically enable the aircraft engine to be kept operating at its full thrust output even while the thrust reverser is providing reverse thrust. In this connection, the thrust reverser should also be able to be immediately inactivated without any need for changing the engine speed to resume acceleration. Finally, the thrust reverser must be made fail-safe so that it will automatically assume an inoperative and cruise position in the event of a hydraulic system failure.

IN-FLIGHT MODULATING THRUST REVERSER

BACKGROUND OF THE INVENTION

This invention relates generally to the field of thrust reversers and, in particular, to a fully or substantially fully modulating-inflight thrust reverser to be added to the engine(s) of advanced fighter aircraft.

It is well understood that the thrust reverser for an aircraft must both stop the rearward flow and then turn the flow into the reverse or upstream direction. Desirably, this should be accomplished with as little disturbance or change as possible in the normal aerodynamic members used for other engine functions. In performing its required functions, it is of considerable importance that the thrust reverser also have relatively good thrust modulation characteristics to provide both for an immediate and full thrust whenever the need arises, as for example, during inflight maneuvers or where a wave-off and an emergency go-around is required during an aircraft landing operation. In other words, it is desirable that the particular thrust reverser specifically enable the aircraft engine to be kept operating at its full thrust output even while the thrust reverser is providing reverse thrust. In this connection, the thrust reverser should also be able to be immediately inactivated without any need for changing the engine speed to resume acceleration. Finally, the thrust reverser must be made fail-safe so that it will automatically assume an inoperative and cruise position in the event of a hydraulic system failure.

The aforementioned objects and advantages have been built into the new and improved thrust reverser system of the present invention by means that have not, so far is known, been taught in previously developed thrust reversers, as will appear self-evident hereinafter in the following summary and detailed description thereof.

SUMMARY OF THE INVENTION

The present invention consists in a new and improved combination that is comprised of a thrust reverser mechanism integrated with a translating flap convergent/divergent (C/D) and variable area exhaust nozzle to provide an in-flight spoiler (air-brake) and landing operation reverse thrust system. For its operation, the inventive system employs four hydraulic actuators during the reverse thrust sequence. Each hydraulic actuator is actuated to a selected position to move a slider element in a confining track which, in turn, simultaneously operates a pair of drive links. One of these drive links is attached to a drive bracket that is, in turn, attached to a unique exhaust duct-translating segment constituting a key feature of the present invention. At the same time, and constituting another unique feature of the invention and also as part of a new and improved combination with the aforementioned translating action of the movable portion or translating segment of the exhaust duct, the operation of each of the said hydraulic actuators also actuates a push rod, constituting the second drive link and which is also attached to the previously-mentioned slider element, to move a second slider element confined in its own separate track and which, in turn, moves a third drive link interconnected with, and driving a novel translating outer cowl of the present invention to its open position which cowl normally covers a reverse thrust-producing cascade incorporated in the aircraft engine-casing or other suitable structure associated therewith. In this manner, the new and improved combination of the present invention of the exhaust duct translating segment and the translating outer cowl are simultaneously opened to thereby completely expose the said reverse thrust-producing cascade.

During the exposure of the cascade to produce the reverse thrust operation to be further described hereinbelow, a set of eight flap-like blocker doors, hinged from the aft-most portion of the exhaust or thrust nozzle inner seals and normally in their opened or stowed position to allow the engine exhaust to flow rearwardly for exit out of the engine exhaust nozzle to produce forward thrust, are each moved to their exhaust nozzle-closing position in a coordinated action with the above-described reverse thrust-producing operation. This coordinated operation of the closing of each of the said blocker doors, which constitutes the crux of the present invention, is initiated by the simultaneous translation of the aforesaid exhaust duct-translating segment. When said exhaust duct translating segment is so translated, a roller attached thereto is also translated in the same plane and is adapted to ride in a blocker cam which is a triangular-shaped section and incorporates a pair of cam tracks. As the said roller translates forwardly in one of said tracks, the blocker cam tends to rotate in a counterclockwise direction. This results in the rotation of a second roller, engaged in the second cam track and a bellcrank fixed thereto in a counterclockwise direction, resulting in a tendency to move a first tension rod, interconnected with the bellcrank, in a forward direction and thus operate a second tension rod fixed thereto to, in this unique manner, close a respective blocker door by way of additional connecting links. The latter closing of each of the blocker doors occurs simultaneously with the previously-described opening of the cascade by the opening of the exhaust duct-translating segment and translating outer cowl for producing the reverse thrust operation. Thus, a substantially constant flow exhaust area is maintained.

Other objects and advantages of the invention will appear hereinbelow in connection with the following disclosure, taken with the accompanying drawings; in which:

BRIEF DESCRIPTION OF THE DRAWINGS

FIG. 2 is a partly schematic and cross-section view, taken about on section 2—2 of FIG. 1, illustrating details of the specific relationship between the exhaust duct-translating segment and translating flap convergent/divergent exhaust nozzle of the invention;

FIG. 5 is another partly schematic and broken-away top view, looking downward in the direction of the arrows A in FIG. 3, and showing certain details of the interconnections between both the main slider element of FIG. 3 and a push rod used with a supplementary, intermediately-disposed slider element in the operation of the translating outer cowl being utilized in unique conjunction with the exhaust duct-translating segment of FIG. 2;

FIG. 6 is still another partly schematic, broken-away and cross-sectional view, taken about on line 6—6 of FIG. 5 to illustrate certain details of the drive means between the hydraulic actuator of FIG. 3, a drive link operated by the main slider element and a drive bracket mounted to the exhaust duct-translating segment.

FIG. 7 is an additional partly schematic, broken-away and cross-sectional view, taken about on line 7—7 of FIG. 5, and illustrating additional details of the drive means for translating the outer cowl of the invention;

FIG. 8 is a further partly schematic, broken-away and cross-sectional view, taken about on line 8—8 of FIG. 1, showing the relationship between a unison ring attached to the exhaust duct-translating segment of the invention and a first roller used as a part of the drive means for operating each of the aircraft engine-exhaust flow-controlling, blocker doors, in a unique concerted action with the simultaneous exposure of the thrust-reversing cascades;

FIG. 9 represents a schematic and partly broken-away view, looking in the direction of the arrows B in FIG. 8 to illustrate details of a uniquely related blocker cam and bellcrank member used to actuate a respective blocker door to its closed position relative to the normal forward thrust-producing orientation of the engine-exhaust flow;

FIG. 9a is a fragmentary, partly broken-away and schematic, cross-sectional view taken about on line 9a—9a of FIG. 9 and more clearly illustrating details of a cam and roller means used in the operation of the blocker door of FIG. 9;

FIG. 10 is another schematic, partly broken-away and cross-sectional view, taken about on line 10—10 of FIG. 9, more clearly illustrating the specific attachment of the bellcrank-roller used in interconnected relation to, and being operated by the action of the bellcrank cam of FIG. 9; and FIGS. 11 and 12 represent fragmentary views of the area of the exhaust nozzle indicated generally by the arrow C in FIG. 8 and respectively depicting one of the blocker doors in its open and closed positions with the detailed operating mechanism being utilized therewith.

DESCRIPTION OF THE PREFERRED EMBODIMENT

Figure 1:
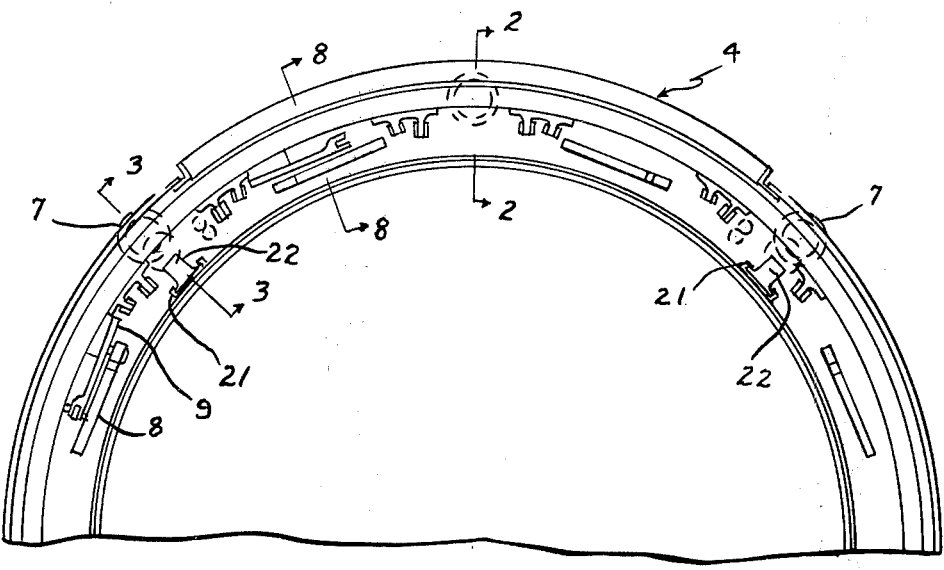
FIG. 1 is an overall orientation, partly schematic and broken-away end view, looking in the forward or upstream direction of the new and improved translating flap C/D nozzle and integrated thrust reverser of the present invention.

Referring generally to the drawings and, in particular, to FIGS. 1 and 2 thereof, the new and improved combined translating flap convergent/divergent (TFCD) nozzle and integrated exhaust duct-thrust reverser of the present invention is depicted as comprising an aircraft engine-exhaust duct indicated generally at 5 as incorporating an exhaust duct-stationary segment 5a, an exhaust duct-translating segment 5b and a stationary shroud 5c within which is disposed the reverse thrust-producing cascade indicated generally at 4. A portion of the translating flap C/D exhaust nozzle of the invention is indicated generally at 29 as being adjustably mounted for translation in a generally forward or aft movement by unison ring 1 to adjust the nozzle throat area for different flight regimes. One of four hydraulic nozzle actuators attached to unison ring 1 and used for the aforementioned general nozzle adjustment is indicated at 29b (FIG. 2).

During the normal forward thrust operation of any appropriate aircraft utilizing the present invention, the exhaust from the engine(s) thereof flows rearwardly through the outlet of the aforementioned exhaust nozzle 29, at which time, reverse flow through the set of cascades at 4 is prevented by the exhaust duct-translating segment 5a that is, of course, disposed inwardly of the said cascades having been adjusted to its closed position. A translating outer cowl 13 (FIG. 7), uniquely operable in conjunction with the translating segment 5b, serves the purpose of providing a streamlined cover for the cascades 4 when the latter are not in use.

Figure 3:
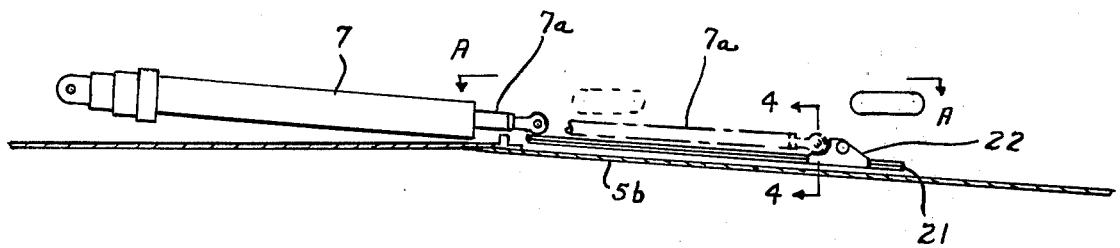
FIG. 3 is a second partly schematic, broken-away, and cross-sectional view, taken about on line 3—3 of FIG. 1, depicting details of the drive means between one of the hydraulic, reverse thrust-actuators of the invention and a main slider element used as a key element in the actuation of the reverse thrust mechanism of the invention.
Figure 4:
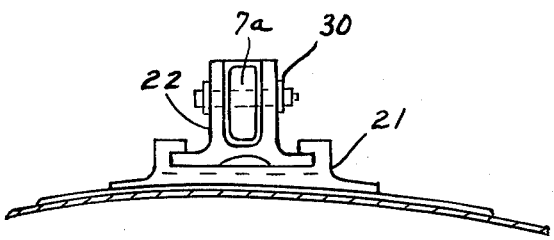
FIG. 4 is a fragmentary and partly schematic view, taken about on line 4—4 of FIG. 3 to more clearly illustrate the specific interconnection between the reverse thrust actuator-arm or interconnecting rod forming part of each of the reverse thrust-hydraulic actuators of the invention and the slider element of FIG. 3.

When it is desired to utilize the cascades 4 for a reverse thrust operation, a set of eight flap-like blocker doors, as at 2 (see FIG. 12, for example), mounted in the aft end portion of the exhaust nozzle 29 and constituting a key feature of the present invention, are used to block the rearward flow of the engine exhaust. Each of the said blocker doors 2, whose operation will be set forth in detail hereinafter, may be hingedly mounted within the nozzle-aft end portion, as for example, to the nozzle inner seals, which seals are located in the aft area of the nozzle 29, indicated generally at the reference numeral 3 in FIGS. 11 and 12. A set of four hydraulic actuators, as at 7 in FIGS. 1 and 3, are used during the reverse thrust sequence as described hereinafter. This reverse thrust sequence, which consists of the coordinated operation of the opening of the reverse thrust exhaust duct or flow path through the cascades 4 and the simultaneous closing of the blocker doors 2, is initiated by operating each of the hydraulic actuators 7 to move a main slider element indicated at 22 in FIG. 3, which main slider element 22 is interconnected with the respective hydraulic actuator 7 by means of the actuator-drive arm or rod 7a, the latter being attached to the slider element 22 in the manner clearly seen in FIG. 4.

The above-referred to movement of the main slider element 22, which is actually a slidable movement occurring in a confining track 21 specifically provided for this purpose, automatically and simultaneously actuates a pair of initial drive links 23 (FIG. 6) and 25 (FIG. 5). It is to be noted that the track 21 serves a dual purpose; namely, that of guiding the main slider element 22 and, additionally, it provides a primary support structure between the forward and aft segments of the stationary exhaust duct 5. The first-named link 23, which is an intermediately-disposed link, is pinned between the main slider element 22 and a drive bracket, seen at 24 in the aforementioned FIG. 6, that is affixed to the previously-described exhaust duct-translating segment 5b. On its movement by the slidable adjustment of the main slider element 22 in its track 21, the line 23 then transmits a force through the drive bracket 24 (FIG. 6) to thereby translate the said exhaust duct-translating segment 5b and its cooling liner 6 in a forward direction to its open position to thereby open an exhaust flow path through the reverse thrust-producing set of cascades 4. At the same time, the second-named link 25, which actually constitutes a push rod and which, as noted hereinbefore, is also coupled to the main slider element 22, pushes an auxiliary, secondary or supplementary slider element 27, as viewed in FIG. 5, which is guided in a track 26, to, in turn, move a driven link 28 (see FIG. 7) that is interconnected between the secondary slider element 27 and the upstream end of the translating outer cowl 13 that is normally used to cover the set of cascades 4 as previously noted. In this manner, the said outer cowl 13 is also moved forward or upstream to its open position to uncover the cascades 4, simultaneously with the previously-described opening of the exhaust duct-translating segment 5b to thus collectively provide for the reverse thrust operation of the invention. It should be noted that initiation of reverse thrust movement by proper positioning of the components can be made with the nozzle in either the opened or closed position. The nozzle is closed nc the unison ring 1 (FIGS. 2 and 8), which is translated by actuators 29b simultaneously with or before movement of the translating duct segment 5b.

Also simultaneously with the above-described combined opening of the exhaust duct-translating segment and outer cowl, 5b and 13, the coordinated opening of each of the exhaust nozzle-blocker doors, as at 2, occurs. To effect this additional new and unique operation of the present invention, the exhaust duct-translating segment 5b, which is therefore translated on operation of the hydraulic actuator 7 is equipped with a roller 12, as indicated in FIGS. 8 and 9, which roller 12 is also translated in the same plane with the duct segment 5b and is adapted to ride in an upper contoured cam slot, (open inward towards the gas side of the systd1m) or trabk 8a of a blocker cam 8 (FIG. 9). The blocker cam 8 is of a triangular configuration and incorporatd1s a pair of cam tracks, luding the previously-mentioned upper slot or track 8a and a lower slot (open outwards towards the ambient side) or track 8b. The specific and integrated relation between the inward and outward-facing slots 8a and 8b, relative to their corresponding rollers 12 and 11 is seen more particularly in FIG. 9a. The solid line position of the blocker cam 8 represents the cruise position, whereas the phantom line position depicts the reverse thrust position. When the roller 12 translates forwardly in the blocker cam 8, as is the case with the previously-described forward translation of the translating segment 5b, by virtue of the engagement of the said roller 12 in the upper cam track 8a, the cam 8 tends to rotate counterclockwise about its pivot 14 (Note FIG. 8) to its phantom line reverse thrust position of FIG. 9. With this action, a second roller 11 (also note FIG. 10) mounted to one arm of a bellcrank 9 and also engaged in the lower cam track 8b of the cam 8 automatically, and simultaneously with the counterclockwise rotation of the cam 8, rotates the said bell-crank 9 also in the counterclockwise direction.

The above-noted counterclockwise rotation of the bellcrank 9 tends to move a first tension rod 10, attached at one end to another arm of the bellcrank 9, in a forward direction or to the left as viewed in FIG. 9 to, in turn, operate a second tension rod 16 indirectly interconnected with the other end of said first tension rod 10 through the pivot means at 15 also in the forward direction. As is seen in FIGS. 11 and 12, respectively representing the open or stowed and closed positions of each of the blocker doors 2, the above-described forward translatory movement of the second tension rod 16 is automatically operative to pivot a short link 17 to which it is attached also in a counterclockwise direction about its pivot point 17a to thereby effect a forward movement on a third tension rod 18 also attached at one end to the link 17 and which in turn results in the forward pivoting of still another link arm 19 about its pivot 19a to thereby close the respective blocker door 2 by way of the blocker link at 20 that is attached to the said link arm 19. As noted hereinbefore, this closing action of the blocker doors, as at 2, to close off the rearward exhaust flow through the exhaust nozzle 29 occurs simultaneously with the coordinated opening of the exhaust duct-translating segment 5b and the outer cowl 13 to thereby maintain a substantially constant flow exhaust area alternatively either through the exhaust nozzle 29 during the forward thrust regime, or through the cascades 4 during the reverse thrust regime.

It should be noted that the exhaust duct-translating segment 5b and outer cowl 13 naturally move only when the reverser actuator 7 is operated to adjust the position of the main slider element 22 in its guide track 21; otherwise, the nozzle actuator 29b may be operated to open and close the nozzle 29 in the conventional manner. Thus, for non-reverse operation, the roller 11 affixed to one arm of the bellcrank 9 merely rides fore and aft in the lower cam slot 8b (FIG. 9) and, in this manner, allows the said bellcrank 9 to translate only without rotating about its pivot 14, thus maintaining a constant geometric relationship between the blocker door 2 and the nozzle seals 3. Of course, as noted hereinbefore, for reverse thrust operation, the roller 12, which is actually mounted on and translates with the unison ring 1 attached to the exhaust duct-translating segment 5b, rides in the upper cam slot 8a to effect rotation both of the cam 8 about its pivot 14 (FIG. 8) and the bellcrank 9 through its roller 11 with the ultimate result being the movement of the blocker door 2 to its exhaust nozzle-closing position of FIG. 12, as explained hereinabove. Finally, the previously-mentioned fail-safe feature of the present apparatus is assured when there is a hydraulic failure, because of the use of the tension rods 10, 16 and 18 which would be automatically operative to return the blocker doors 2 to their stowed position of FIG. 11 and, at the same time, reset the translating segment 5b and outer cowl 13 to their closed positions relative to the cascades 4 by virtue of the interconnection between the first tension rod 10, bellcrank 9, cam 8 and translating segment 5b.

We claim:

1. In a combined translating flap convergent/divergent variable area-aircraft engine-exhaust nozzle and integrated thrust reverser mechanism; an exhaust duct having an outer, stationary shroud portion; a thrust reverser-set of cascades mounted to said shroud portion; a first, inner, exhaust duct-stationary segment; a second, inner, exhaust duct-translating segment disposed in a normally closed relation to said first, exhaust duct-stationary segment when the engine exhaust is being ejected in an aft direction during the forward thrust regimen to thereby close off the reverse thrust-exhaust flow path through said cascades; a variable throat area-exhaust nozzle receiving and discharging the engine exhaust being ejected in the said aft direction; an outer cowl member normally covering said cascades during the forward thrust regimen; first, exhaust nozzle-hydraulic actuator means operative to generally open and close the exhaust nozzle to thereby vary its throat area during different forward thrust-flight regimes; first, thrust reverser-actuating means interconnected with and operable to simultaneously adjust both of the said second, exhaust duct-translating segment and said outer cowl member to their open positions to thereby open the reverse thrust-exhaust flow path through said cascades; separate, exhaust flow-controlling means positioned at the aft end of said exhaust nozzle and selectively operable to open and close the forward thrust-exhaust flow path through said exhaust nozzle; second, thrust reverser-actuating means interconnected between said first, thrust reverser-actuating means and said separate, exhaust flow-controlling means and automatically effective by the operation of said first-named, actuating means to actuate said separate, exhaust flow-controlling means to its closed position to thereby shut off the engine exhaust flow in an aft direction through said exhaust nozzle when the reverse thrust regime is in operation; and second, thrust reverser-hydraulic actuator means interconnected with and operable to adjust said first, thrust reverser-actuating means to the thrust reverser regime and thereby move both of the said second, exhaust duct-translating segment and said outer cowl member to their opened positions to thus open the reverse thrust-exhaust flow path through said cascades.

2. In a combined translating flap convergent/divergent variable area-aircraft engine-exhaust nozzle and integrated thrust reverser mechanism as in claim 1 wherein said second, thrust reverser-hydraulic actuator means comprises; a hydraulic actuator; a main slider member interconnected with and being operated by said hydraulic actuator; and first, driven means interconnected between said main slider member and said second, exhaust duct-translating segment.

3. In a combined translating flap convergent/divergent variable area-aircraft engine-exhaust nozzle and integrated thrust reverser mechanism as in claim 2, and second, driven means interconnected between said main slider member and said outer cowl member.

4. In a combined translating flap convergent/divergent variable area-aircraft engine-exhaust nozzle and integrated thrust reverser mechanism as in claim 3, wherein said second, thrust reverser-actuating means comprises third driven means interconnected between said second, exhaust duct-translating segment and said separate, exhaust flow-controlling means.

5. In a combined translating flap convergent/divergent variable area-aircraft engine-exhaust nozzle and integrated thrust reverser mechanism as in claim 4, wherein said separate, exhaust flow-controlling means comprises a plurality of blocker doors pivotally mounted to the aft end portion of the exhaust nozzle and positionable between a first open-door position in stowed relation to the said exhaust nozzle and a second, closed-door position blocking the flow of engine exhaust in an aft direction through said exhaust nozzle.

6. In a combined translating flap convergent/divergent variable area-aircraft engine-exhaust nozzle and integrated thrust reverser mechanism as in claim 5, wherein said first, driven means comprises; a first link member pinned between said main slider member and said exhaust duct-translating segment.

7. In a combined translating flap convergent/divergent variable area-aircraft engine-exhaust nozzle and integrated thrust reverser mechanism as in claim 6, wherein said second, driven means comprises; a second link member/push rod pinned at one end thereof to said main slider member; a second slider member pinned to the other end of said second link member/push rod; and a third link member interconnected between said second slider member and said outer cowl member.

8. In a combined translating flap convergent/divergent variable area-aircraft engine-exhaust nozzle and integrated thrust reverser mechanism as in claim 7, wherein said third driven means comprises a bellcrank member operably interconnected between said exhaust duct-translating segment and a respective blocker door to thereby reposition said blocker door to a closed position relative to and blocking the exhaust flow path through said exhaust nozzle during the reverse thrust regime.

9. In a combined translating flap convergent/divergent variable area-aircraft engine-exhaust nozzle and integrated thrust reverser mechanism as in claim 8, wherein said third driven means further comprises; an exhaust duct-translating segment; a roller element affixed to said duct translating segment; a cam member having a first track portion in which said roller member rides to rotate said cam member in a predetermined direction during the translatory movement of said exhaust duct-translating segment; and interconnecting driven means between said cam member and said blocker door automatically actuating said blocker door to its exhaust nozzle-closing position when said reverse thrust regime is in operation.

10. In a combined translating flap convergent/divergent variable area-aircraft engine-exhaust nozzle and integrated thrust reverser mechanism as in claim 9, wherein said interconnecting drive means comprises; a first, tension rod attached at one end thereof to, and being repositioned by the pivotal movement of said cam member; a second tension rod indirectly attached at one end thereof to, and being simultaneously operated by the movement of said first tension rod; an intermediate pivot link attached to the other end of said second tension rod; a third tension rod interconnected between said pivot link and the outer end of a link arm; and a blocker link element interconnected between said link arm-outer end and said blocker door.

* * * * *